Aug. 25, 1925.

E. G. KESLING 1,550,905

MEANS FOR AND METHOD OF ARTICULATING ARTIFICIAL TEETH

Filed April 22, 1924    2 Sheets-Sheet 1

Elmer G. Kesling
INVENTOR

Aug. 25, 1925.

E. G. KESLING 1,550,905

MEANS FOR AND METHOD OF ARTICULATING ARTIFICIAL TEETH

Filed April 22, 1924   2 Sheets-Sheet 2

Elmer G. Kesling
INVENTOR

Patented Aug. 25, 1925.

1,550,905

UNITED STATES PATENT OFFICE.

ELMER G. KESLING, OF BLOOMFIELD, MISSOURI.

MEANS FOR AND METHOD OF ARTICULATING ARTIFICIAL TEETH.

Application filed April 22, 1924. Serial No. 708,217.

*To all whom it may concern:*

Be it known that I, ELMER G. KESLING, a citizen of the United States, residing at Bloomfield, in the county of Stoddard and State of Missouri, have invented a new and useful Means for and Methods of Articulating Artificial Teeth, of which the following is a specification.

This invention relates to the production of artificial dentures, and particularly to the means and method by which they are articulated.

The general object of the invention is to provide a pattern or substitute arch, and a method of using the same, preparatory to the placing of the artificial teeth, whereby the proper relative positions of the latter may be quickly and accurately determined, so that correct articulation is effected.

Manufacturers now form their artificial teeth so as to produce an anatomical articulation when the individual teeth are set up in a certain relative relation. It is a very difficult and arduous task for the dentist to correctly place these artificial teeth individually in the denture, so as to obtain the desired relation between them.

In the present invention the correct relative positions of the several artificial teeth are predetermined by means of a pattern or substitute arch, which consists essentially of models of the artificial teeth arranged in the proper relative positions for articulation and joined at their contacting surfaces, thereby forming substantially a dental arch of one piece, which is used in forming sockets in the wax bases of the dentures for the reception of the necks of the artificial teeth.

In the construction of the artificial dentures, these patterns or substitute arches are placed upon their respective wax bases that have been formed on the jaw casts. These casts are preferably mounted in a dental articulator, and the parts representing the necks of the teeth are pressed into the wax bases until the correct position is attained, after which the patterns are removed and the artificial teeth placed in the sockets thus formed in the wax, thereby resulting in a properly articulated case that has required very little time or skill to produce.

The invention will be more clearly understood from the following detailed description taken in connection with the accompanying drawings, which illustrates the preferred means and method constituting the invention.

In the drawings:

Figure 1 is a perspective view of an upper pattern arch.

Figure 2 is a perspective view of a lower pattern arch.

Figure 3 is a perspective view of an upper and a lower pattern arch in central occlusion and made in one piece.

Figure 4 is a perspective view of the pattern arches placed in the proper articulated position between jaw casts mounted on a dental articulator.

Figure 8 is a plan view of the lower jaw cast and wax base after the sockets have been formed therein.

Figure 9 is a section taken on the line 9—9 of Figure 8.

The upper and lower pattern arches indicated by the numerals 1 and 2, respectively, are preferably made from non-corrosive metal, or equally substantial material, and consist essentially of models 3 of a set of artificial teeth arranged in anatomically articulated relation, the entire set being formed in one casting, so that they are integrally joined together at their contacting surfaces, as indicated at 4. In order to make the arch more substantial its posterior ends may be braced by a bar 5.

These pattern arches are to be manufactured and supplied to dentists in different shapes and sizes, modeled after natural teeth or sets of artificial teeth that have been placed in correct position for proper articulation. Each set of teeth may be reproduced in pattern arches in as many sets as is desired. They may be made in single pairs, or several lower sets may be made that will articulate with a single upper set, and vice versa. Pairs of arches, upper and lower, may be made integral, as shown in Figure 3, or they may be made separately as shown in Figures 1 and 2, and temporarily secured together, when desired, in any suitable manner. The anchorage pins and holes of the artificial teeth are not reproduced in the patterns, but instead are either filled in or blocked off as the case may be.

Figure 5:
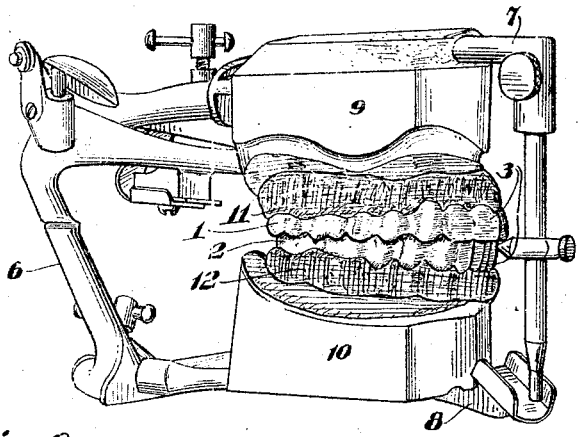
Figure 5 is a perspective view of the pattern arches properly positioned upon and pressed into the wax bases.
Figure 6:
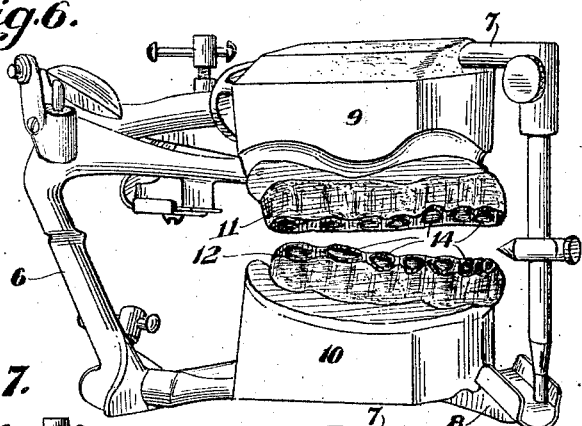
Figure 6 is a perspective view of the jaw casts with the wax bases after the pattern arches have been removed, showing the sockets correctly formed for receiving the artificial teeth.
Figure 7:
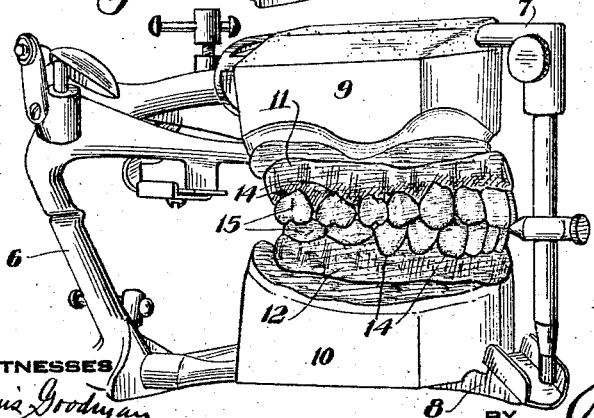
Figure 7 is a perspective view similar to Figure 5, but showing the pattern arches replaced by the artificial teeth.

In the construction of the artificial dentures it is preferred to use a dental articulator 6, which may be of any preferred make, with an upper jaw 7 and a lower jaw 8 to which may be secured casts or models 9 and 10 respectively, of the edentulous jaws. Certain pairs of the pattern arches 1 and 2 are placed between the models 9 and 10, as illustrated in Figure 4, to ascertain the correct pair to be used in the case. The wax bases 11 and 12 are then placed upon the models 9 and 10, respectively, and the selected patterns 1 and 2 are placed between the wax bases, and the necks 13 of the pattern teeth are then pressed into the wax by closing the articulator, as shown in Figure 5, or in any other manner to properly position the patterns with respect to the models and to each other to effect a proper articulation for the case. The pattern arches are then removed, leaving sockets 14, as shown in Figure 6, formed in the wax bases, which are of proper size and shape to receive the necks of the artificial teeth 15. The artificial teeth 15 are then placed in position as shown in Figure 7, and a proper articulation thereof will be effected. The waxing up of the case may then be accomplished in the usual manner.

While I have shown and described the invention as used in connection with a dental articulator, it is obvious that it could be used directly in the mouth. Having made the jaw casts and wax bases, the pattern arches could by trials in the patient's mouth be finally adjusted to the proper articulation, thus dispensing entirely with the dental articulator.

The pattern arches are not changed or destroyed in any way by their use. They may, therefore, be used over and over again for any number of cases. Each dentist is supposed to have a sufficient assortment of pattern arches on hand, so that he will have the correct ones for use in any given case.

Although I have shown the pattern arches as consisting of full sets, it is obvious that a portion of the arch may be left out, and the remaining portions secured by a bar or plate.

What is claimed is:

1. A method of articulating artificial teeth, which consists in preparing a wax base, forming sockets in a predetermined relation therein by the impression of a pre-articulated assembly of pattern teeth, and then substituting the respective artificial teeth for the assembly of pattern teeth in the sockets thus formed.

2. A method of articulating artificial teeth, which consists in preparing a wax base, forming sockets in predetermined relation therein by the impression of a pre-articulated pattern arch, and then substituting the respective artificial teeth for the teeth of the pattern arch in the sockets thus formed.

3. A method of articulating artificial teeth, which consists in providing a model of the edentulous jaw, selecting from an assortment of pattern arches the one which best fits the same, then preparing a wax base on said model, forming sockets in predetermined relation therein by the impression of the selected pattern, and then substituting the individual artificial teeth for the teeth of the pattern in the sockets thus formed.

4. A method of articulating artificial teeth, which consists in providing a model of the edentulous jaw, selecting from an assortment of pattern teeth, arranged in assemblies for correct articulation, the assembly which best fits the prepared model of the jaw, then preparing a wax base on said jaw model, forming sockets in predetermined relation therein by the impression of the selected assembly of pattern teeth, and then substituting the individual artificial teeth for the pattern teeth of the assembly in the sockets thus formed.

5. As an article of manufacture, an assembly of pattern teeth modeled after corresponding artificial teeth to be arranged on a plate, said pattern teeth being arranged for correct articulation and integrally connected.

6. As an article of manufacture, a pattern arch formed of teeth modeled after corresponding artificial teeth to be arranged on a plate, the teeth of said pattern arch being arranged for correct articulation and integrally connected in one casting.

7. As an article of manufacture, a pattern comprising upper and lower arches formed of metallic teeth modeled after corresponding artificial teeth to be arranged on a plate, said metallic teeth being integrally connected in one casting and properly articulated.

In testimony, that I claim the foregoing as my own, I have hereto affixed my signature.

ELMER G. KESLING.